United States Patent
Heessels et al.

(10) Patent No.: US 11,400,684 B2
(45) Date of Patent: Aug. 2, 2022

(54) TAPE OF A PLURALITY OF SHEATHED CONTINUOUS MULTIFILAMENT STRANDS

(71) Applicant: SABIC GLOBAL TECHNOLOGIES B.V., Bergen op Zoom (NL)

(72) Inventors: Frank Heessels, Bergen op Zoom (NL); Carmela Tufano, Maastricht (NL); Carmen Rocio Misiego Arpa, Geleen (NL); Muhammad Farooq, Al-Jubail (SA); Rick Robert Emilie Bercx, Geleen (NL); Jose Sales Fernandez, Geleen (NL); Leonardus Jacobs, Geleen (NL); Christelle Marie Helene Grein, Geleen (NL); Yuan Qin, Geleen (NL); Adrianus Franciscus Petronella Maria Willigers, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 28 days.

(21) Appl. No.: 16/772,420

(22) PCT Filed: Dec. 21, 2018

(86) PCT No.: PCT/EP2018/086544
§ 371 (c)(1),
(2) Date: Jun. 12, 2020

(87) PCT Pub. No.: WO2019/122317
PCT Pub. Date: Jun. 27, 2019

(65) Prior Publication Data
US 2021/0070009 A1  Mar. 11, 2021

(30) Foreign Application Priority Data

Dec. 22, 2017  (EP) ..................................... 17210358

(51) Int. Cl.
*B32B 5/02* (2006.01)
*B29B 15/12* (2006.01)
(Continued)

(52) U.S. Cl.
CPC .............. *B32B 5/02* (2013.01); *B29B 15/122* (2013.01); *B29C 70/20* (2013.01); *B29C 70/521* (2013.01); *B32B 5/024* (2013.01); *B32B 5/26* (2013.01); *B32B 5/263* (2021.05); *C08J 5/043* (2013.01); *C08J 5/08* (2013.01); *C08K 7/14* (2013.01);
(Continued)

(58) Field of Classification Search
CPC ..... C08K 7/14; C08J 5/08; C08J 5/043; C08J 2323/10; C08J 2323/14; B29K 2023/12; B29B 15/122; B29B 9/14; B29B 9/06; B32B 2260/021; B32B 2262/101;
(Continued)

(56) References Cited

U.S. PATENT DOCUMENTS 4,338,233 A  7/1982  Das et al.
5,017,714 A  5/1991  Welborn, Jr.
(Continued)

FOREIGN PATENT DOCUMENTS

EP  0206189 A1  12/1986
EP  0397505 A2  11/1990
(Continued)

OTHER PUBLICATIONS

International Search Report for International Application No. PCT/EP2018/086544, International Filing Date Dec. 21, 2018, dated Feb. 22, 2019, 5 pages.
(Continued)

*Primary Examiner* — Camie S Thompson
(74) *Attorney, Agent, or Firm* — Cantor Colburn LLP

(57) ABSTRACT

The invention relates to a tape comprising a plurality of sheathed continuous multifilament strands, wherein each of the sheathed continuous multifilament strands comprises a core that extends in the longitudinal direction and a polymer sheath which intimately surrounds said core, wherein each of the cores comprises an impregnated continuous multifilament strand comprising at least one continuous glass multifilament strand, wherein the at least one continuous glass multifilament strand is impregnated with an impregnating agent in an amount from 0.50 to 15.0 wt %, for example from 0.5 to 10.0 wt % or for example from 10.0 to 15.0 wt % based on the sheathed continuous multifilament strand, wherein the impregnating agent has a melting point of at least 20° C. below the melting point of the thermoplastic polymer composition, has a viscosity of from 2.5 to 200 cSt at 160° C., wherein the continuous glass multifilament strand comprises at most 2 wt % of a sizing composition based on the continuous glass multifilament strand and wherein the polymer sheath consists of a thermoplastic polymer composition, wherein the thermoplastic polymer composition comprises at least 60 wt %, for example at least 80 wt % of a thermoplastic polymer, wherein the amount of impregnated continuous multifilament strand is in the range of 10 to 70 wt % based on the sheathed continuous multifilament strands and wherein the amount of polymer sheath is in the range of 30 to 90 wt % based on the sheathed continuous multifilament strand and wherein the sum of the amount of impregnated continuous multifilament strand and the polymer sheath is 100 wt %.

16 Claims, No Drawings

(51) Int. Cl.
  *B29C 70/20* (2006.01)
  *B29C 70/52* (2006.01)
  *B32B 5/26* (2006.01)
  *C08J 5/04* (2006.01)
  *C08K 7/14* (2006.01)
  *C08J 5/08* (2006.01)
  *B29K 101/12* (2006.01)
  *B29K 309/08* (2006.01)
  *B29L 7/00* (2006.01)

(52) U.S. Cl.
  CPC ...... *B29K 2101/12* (2013.01); *B29K 2309/08* (2013.01); *B29L 2007/007* (2013.01); *B32B 2260/021* (2013.01); *B32B 2260/046* (2013.01); *B32B 2262/101* (2013.01); *B32B 2262/12* (2013.01); *C08J 2323/12* (2013.01); *C08J 2323/14* (2013.01); *C08J 2323/16* (2013.01)

(58) Field of Classification Search
  CPC . B32B 2262/12; B32B 5/02; B29L 2007/007; B29L 2031/731
  USPC ....... 428/298.1, 34.4, 34.6, 378; 57/229, 32, 57/295, 297; 156/167, 244.12
  See application file for complete search history.

(56) References Cited

U.S. PATENT DOCUMENTS

| | | |
|---|---|---|
| 5,324,820 A | 6/1994 | Baxter |
| 2010/0313605 A1* | 12/2010 | Soliman .................. B29B 9/14 65/442 |
| 2017/0334094 A1 | 11/2017 | Pellet et al. |
| 2020/0087498 A1* | 3/2020 | Lecouvet .............. C08F 210/16 |

FOREIGN PATENT DOCUMENTS

| | | |
|---|---|---|
| EP | 1460166 A1 | 9/2004 |
| EP | 0994978 B1 | 10/2004 |
| EP | 0921919 B1 | 7/2005 |
| WO | 2009080281 A1 | 7/2009 |
| WO | 2011156693 A2 | 12/2011 |
| WO | 2011163365 A2 | 12/2011 |
| WO | 2014053590 A1 | 4/2014 |
| WO | 2016083327 A1 | 6/2016 |
| WO | 2016142784 A1 | 9/2016 |

OTHER PUBLICATIONS

Written Opinion for International Application No. PCT/EP2018/086544, International Filing Date Dec. 21, 2018, dated Feb. 22, 2019, 5 pages.

* cited by examiner

TAPE OF A PLURALITY OF SHEATHED CONTINUOUS MULTIFILAMENT STRANDS

CROSS REFERENCE TO RELATED APPLICATIONS

This application is a National Stage application of PCT/EP2018/086544, filed Dec. 21, 2018, which claims the benefit of European Application No. 17210358.2, filed Dec. 22, 2017, both of which are incorporated by reference in their entirety herein.

The present invention relates to a fiber reinforced tape, to a laminate prepared from said tape, to a process for the preparation of said tape and said laminate, to an article comprising said tape or said laminate and to the use of said tape and laminate in applications, such as automotive applications.

Introduced more than a half century ago, fibre-reinforced plastics are composite materials with a wide range of applications in industry, for example in the automotive industry. The term "composite" can apply to any combination of individual materials, for example to a thermoplastic polymer (the matrix) in which fibres (reinforcing filler) have been dispersed. The reinforced plastics industry has used glass fibres in different forms for reinforcing polymer matrices to produce a diversity of products.

In the production of short glass fibre compositions or compounds, chopped strands of pre-determined length are mixed with a thermoplastic polymer in an extruder, during which the integrity of the glass fibre strands is destroyed and the glass fibres are dispersed throughout the molten thermoplastic polymer; due to fibre breakage the fibre length is decreased during this process, typically to well below 1 mm. Long glass fibre-reinforced polymer compositions contain glass fibres having a length of at least 1 mm, often at least 2 mm and typically between 5 and 20 mm. As a result, glass fibres in moulded articles made from long glass fibre-reinforced polymer compositions generally are of higher length than in articles made from short glass fibre compositions, resulting in better mechanical properties. For that reason long glass fibre-reinforced polymer compositions are preferred for applications wherein good mechanical properties are necessary.

However, reinforcement of a thermoplastic polymer by using glass adds a lot of weight to an article, since the thermoplastic polymer generally has a lower density than glass. In order to be able to prepare light weight articles, which still have sufficient strength, in recent years, long glass fibre-reinforced tapes have been introduced into the market to allow for the production of light-weight articles with sufficient strength due to the use of the reinforcing tape.

A special class of tapes are unidirectional tapes, which are tapes that have fibers that extend substantially in the longitudinal direction. Such unidirectional tapes are typically used to prepare articles having properties that vary in one or more directions or dimensions.

Examples of unidirectional glass fiber tapes are known from WO2016/142784A1. WO2016/142784A1 discloses a fiber-reinforced composite comprising:
 a matrix material including a thermoplastic material; and
 a non-woven fibrous region comprising a plurality of continuous fibers dispersed in the matrix material;
 wherein the width and the length of the non-woven fibrous region are substantially equal to the width and the length, respectively, of the fiber-reinforced composite;
 wherein the non-woven fibrous region has a mean relative fiber area coverage (RFAC) (%) of from 65 to 90 and a coefficient of variance (COV) (%) of from 3 to 20; and
 wherein each of the plurality of continuous fibers is substantially aligned with the length of the fiber-reinforced composite.

Unidirectional composite fiber prepregs are for example described in WO2011/163365 A2 and composite fiber profiles are for example described in WO2011/156693 A2.

Reinforced composites from thermoplastic materials combine the stiffness provided by the reinforcement with the advantageous properties of a thermoplastic material, such as easy molding and plying of the material above a certain temperature and solidification below that temperature.

However, while such unidirectional glass fiber tape may have the advantage of a good stiffness, its impact strength is not sufficient for all applications.

Therefore, it is the object of the invention to provide a unidirectional glass fiber tape having an improved impact strength while maintaining the stiffness.

This object is achieved by a tape comprising a plurality of sheathed continuous multifilament strands,
 wherein each of the sheathed continuous multifilament strands comprises a core that extends in the longitudinal direction and a polymer sheath which intimately surrounds said core,
 wherein each of the cores comprises an impregnated continuous multifilament strand comprising at least one continuous glass multifilament strand, wherein the at least one continuous glass multifilament strand is impregnated with an impregnating agent in an amount from 0.50 to 18.0 wt %, for example from 0.5 to 10.0 wt % or for example from 10.0 to 18.0 wt % based on the sheathed continuous multifilament strand,
 wherein the impregnating agent has a melting point of at least 20° C. below the melting point of the thermoplastic polymer composition, has a viscosity of from 2.5 to 200 cSt at 160° C.,
 wherein the continuous glass multifilament strand comprises at most 2 wt % of a sizing composition based on the continuous glass multifilament strand
 and wherein the polymer sheath consists of a thermoplastic polymer composition, wherein the thermoplastic polymer composition comprises at least 60 wt %, for example at least 80 wt % of a thermoplastic polymer,
 wherein the amount of impregnated continuous multifilament strand is in the range of 10 to 70 wt % based on the sheathed continuous multifilament strands and wherein the amount of polymer sheath is in the range of 30 to 90 wt % based on the sheathed continuous multifilament strand and wherein the sum of the amount of impregnated continuous multifilament strand and the polymer sheath is 100 wt %.

It has been found that the impact energy per unit of thickness is higher for the examples according to the invention which contain wax (impregnating agent) as compared to the comparative examples which do not have wax in their composition. In addition, the E-modulus (also known as Young's modulus or stiffness) may be increased by the tapes of the invention as well.

Therefore, for tapes according to the invention, the impact energy per unit of thickness as measured according to the method as described herein is higher as compared to tapes from a plurality of sheathed continuous multifilament strands having a core that is not impregnated with an impregnating agent.

In the context of the invention with 'tape' is meant an object whose thickness is very thin in relation to its length and width. That is, the tape has a high width to thickness ratio. Typically the width of a tape is between 2-100 times larger than the thickness. The length of the tape can be indefinite. The tape may have a rectangular cross-, but may also have profiled sections (corrugated, ribbed etc.).

The tape of the invention may for example have a thickness in the range from 0.1 to 10 mm and/or a width in the range from 10 to 400 mm.

Each core of a sheathed continuous multifilament strands comprises an impregnated continuous multifilament strands, for example one or more impregnated continuous multifilament strands. Preferably, the one ore more impregnated continuous multifilament strands form at least 90 wt %, more preferably at least 93 wt %, even more preferably at least 95 wt %, even more preferably at least 97 wt %, even more preferably at least 98 wt %, for example at least 99 wt % of the core. In a preferred embodiment, each core consists of the one or more impregnated continuous multifilament strands.

In the context of the invention with 'extends in the longitudinal direction' is meant 'oriented in the direction of the long axis of the sheathed continuous multifilament strand The impregnated continuous multifilament strand is prepared from a continuous glass multifilament strand and an impregnating agent.

The term intimately surrounding as used herein is to be understood as meaning that the polymer sheath substantially entirely contacts the core. Said in another way the sheath is applied in such a manner onto the core that there is no deliberate gap between an inner surface of the sheath and the core containing the impregnated continuous multifilament strands. A skilled person will nevertheless understand that a certain small gap between the polymer sheath and the glass filaments may be formed as a result of process variations. Preferably, therefore, the polymer sheath comprises less than 5 wt. % of said filament, preferably less than 2 wt. % of filament based on the total weight of the polymer sheath.

Preferably, the thickness of the polymer sheath in the sheathed continuous multifilament strand is between 500 and 1500 micrometer.

Glass fibres are generally supplied as a plurality of continuous, very long filaments, and can be in the form of strands, rovings or yarns. A filament is an individual fibre of reinforcing material. A strand is a plurality of bundled filaments. Yarns are collections of strands, for example strands twisted together. A roving refers to a collection of strands wound into a package.

For purpose of the invention, a glass multifilament strand is defined as a plurality of bundled glass filaments.

Glass multifilament strands and their preparation are known in the art.

The filament density of the continuous glass multifilament strand may vary within wide limits. For example, the continuous glass multifilament strand may have at least 500, for example at least 1000 glass filaments/strand and/or at most 10000, for example at most 5000 grams per 1000 meter. Preferably, the amount of glass filaments/strands is in the range from 500 to 10000 grams per 1000 meterglass filaments/strand.

The thickness of the glass filaments is preferably in the range from 5 to 50 μm, more preferably from 10 to 30 μm, even more preferably from 15 to 25 μm. Usually the glass filaments are circular in cross section meaning the thickness as defined above would mean diameter. The glass filaments are generally circular in cross section.

The length of the glass filaments is in principle not limited as it is substantially equal to the length of the sheathed continuous multifilament strand. For practical reasons of being able to handle the tape however, it may be necessary to cut the sheathed continuous multifilament strand into a shorter strand. For example the length of the sheathed continuous multifilament strand is at least 1 m, for example at least 10 m, for example at least 50 m, for example at least 100 m, for example at least 250 m, for example at least 500 m and/or for example at most 25 km, for example at most 10 km.

The continuous glass multifilament strand in the tape of the invention comprises at most 2 wt %, preferably in the range from 0.10 to 1 wt % of a sizing based on the continuous glass multifilament strand. The amount of sizing can be determined using ISO 1887:2014.

A sizing composition is typically applied to the glass filaments before the glass filaments are bundled into a continuous glass multifilament strand.

Suitable examples of sizing compositions include solvent-based compositions, such as an organic material dissolved in aqueous solutions or dispersed in water and melt- or radiation cure-based compositions. Preferably, the sizing composition is an aqueous sizing composition.

As described in the art, e.g. in documents EP1460166A1, EP0206189A1 or U.S. Pat. No. 4,338,233, the aqueous sizing composition may include film formers, coupling agents and other additional components.

The film formers are generally present in effective amount to protect fibres from interfilament abrasion and to provide integrity and processability for fibre strands after they are dried. Suitable film formers are miscible with the polymer to be reinforced. For example; for reinforcing polypropylenes, suitable film formers generally comprise polyolefin waxes.

The coupling agents are generally used to improve the adhesion between the matrix thermoplastic polymer and the fibre reinforcements. Suitable examples of coupling agents known in the art as being used for the glass fibres include organofunctional silanes. More particularly, the coupling agent which has been added to the sizing composition is an aminosilane, such as aminomethyl-trimethoxysilane, N-(beta-aminoethyl)-gamma-aminopropyl-trimethoxysilane, gamma-aminopropyl-trimethoxysilane gamma-methylaminopropyl-trimethoxysilane, delta-aminobutyl-triethoxysilane, 1,4-aminophenyl-trimethoxysilane. Preferably, in the tape of the invention, the sizing composition contains an aminosilane to enable a good adhesion to the thermoplastic matrix. The sizing composition may further comprise any other additional components known to the person skilled in the art to be suitable for sizing compositions. Suitable examples include but are not limited to lubricants (used to prevent damage to the strands by abrasion) antistatic agents, crosslinking agents, plasticizers, surfactants, nucleation agents, antioxidants, pigments as well as mixtures thereof.

Typically, after applying the sizing composition to the glass filaments, the filaments are bundled into the continuous glass multifilament strands and then wound onto bobbins to form a package.

In the tape of the invention, the impregnated continuous multifilament strand is prepared from a continuous glass multifilament strand and an impregnating agent and in particular by applying an impregnating agent to the continuous glass multifilament strand in an amount from 0.50 to 18.0 wt %, for example from 0.5 to 10.0 wt % or for example from 10.0 to 18.0 wt % based on the sheathed continuous multifilament strands.

The optimal amount of impregnating agent applied to the continuous glass multifilament strand depends on the polymer sheath, on the size (diameter) of the glass filaments forming the continuous glass strand, and on the type of sizing composition. Typically, the amount of impregnating agent applied to the continuous glass multifilament strand is for example at least 0.50 wt %, preferably at least 1.0 wt %, preferably at least 1.5 wt %, preferably at least 2 wt %, preferably at least 2.5 wt % and/or at most 10.0 wt %, preferably at most 9.0 wt %, more preferably at most 8.0 wt %, even more preferably at most 7.0 wt %, even more preferably at most 6.0 wt %, even more preferably at most 5.5 wt %, or for example at least 10.0 wt %, preferably at least 11 wt %, preferably at least 12 wt % and/or at most 18 wt %, preferably at most 16 wt %, preferably at most 14% based on the amount of sheathed continuous multifilament strands. Preferably, the amount of impregnating agent is in the range from 1.5 to 8 wt %, even more preferably in the range from 2.5 wt % to 6.0 wt % based on the sheathed continuous multifilament strand. A higher amount of impregnating agent increases the Impact Energy per unit of thickness (J/mm). However, for reasons of cost-effectiveness and low emissions (volatile organic compounds) and mechanical properties, the amount of impregnating agent should also not become too high.

For example, the ratio of impregnating agent to continuous glass multifilament strand is in the range from 1:4 to 1:30, preferably in the range from 1:5 to 1:20.

The viscosity of the impregnating agent is in the range from 2.5 to 200 cSt at 160° C., preferably at least 5.0 cSt, more preferably at least 7.0 cSt and/or at most 150.0 cSt, preferably at most 125.0 cSt, preferably at most 100.0 cSt at 160° C.

An impregnating agent having a viscosity higher than 100 cSt is difficult to apply to the continuous glass multifilament strand. Low viscosity is needed to facilitate good wetting performance of the fibres, but an impregnating agent having a viscosity lower than 2.5 cSt is difficult to handle, e.g., the amount to be applied is difficult to control; and the impregnating agent could become volatile. For purpose of the invention, unless otherwise stated, the viscosity of the impregnating agent is measured in accordance with ASTM D 3236-15 (standard test method for apparent viscosity of hot melt adhesives and coating materials, Brookfield viscometer Model RVDV 2, #27 spindle, 5 r/min) at 160° C.

The melting point of (that is the lowest melting temperature in a melting temperature range) the impregnating agent is at least 20° C. below the melting point of the thermoplastic polymer composition. Preferably, the impregnating agent has a melting point of at least 25 or 30° C. below the melting point of the thermoplastic polymer composition. For instance, when the thermoplastic polymer composition has a melting point of about 160° C., the melting point of the impregnating agent may be at most about 140° C.

Suitable impregnating agents are compatible with the thermoplastic polymer to be reinforced, and may even be soluble in said polymer. The skilled man can select suitable combinations based on general knowledge, and may also find such combinations in the art.

Suitable examples of impregnating agents include low molar mass compounds, for example low molar mass or oligomeric polyurethanes, polyesters such as unsaturated polyesters, polycaprolactones, polyethyleneterephthalate, poly(alpha-olefins), such as highly branched polyethylenes and polypropylenes, polyamides, such as nylons, and other hydrocarbon resins.

For reinforcing polypropylenes, the impregnating agent preferably comprises highly branched poly(alpha-olefins), such as highly branched polyethylenes, modified low molecular weight polypropylenes, mineral oils, such as, paraffin or silicon and any mixtures of these compounds.

The impregnating agent preferably comprises at least 20 wt %, more preferably at least 30 wt %, more preferably at least 50 wt %, for example at least 99.5 wt %, for example 100 wt % of a branched poly(alpha-olefin), most preferably a branched polyethylene. To allow the impregnating agent to reach a viscosity of from 2.5 to 200 cSt at 160° C., the branched poly(alpha-olefin) may be mixed with an oil, wherein the oil is chosen from the group consisting of mineral oils, such as a paraffin oil or silicon oil; hydrocarbon oils; and any mixtures thereof.

Preferably, the impregnating agent is non-volatile, and/or substantially solvent-free. In the context of the present invention, non-volatile means that the impregnating agent has a boiling point or range higher than the temperatures at which the impregnating agent is applied to the continuous multifilament glass strand. In the context of present invention, "substantially solvent-free" means that impregnating agent contains less than 10 wt % of solvent, preferably less than 5 wt % of solvent based on the impregnating agent. In a preferred embodiment, the impregnating agent does not contain any organic solvent.

The impregnating agent may further be mixed with other additives known in the art. Suitable examples include lubricants; antistatic agents; UV stabilizers; plasticizers; surfactants; nucleation agents; antioxidants; pigments; dyes; and adhesion promoters, such as a modified polypropylene having maleated reactive groups; and any combinations thereof, provided the viscosity remains within the desired range. Any method known in the art may be used for applying the liquid impregnating agent to the continuous glass multifilament strand. Suitable methods for applying the impregnating agent to the continuous multifilament strands include applicators having belts, rollers, and hot melt applicators. Such methods are for example described in documents EP0921919B1 and EP0994978B1, in EP0397505B1 and references cited therein. The method used should enable application of a constant amount of impregnating agent to the continuous multifilament strand.

Any method known in the art may be used for applying the liquid impregnating agent to the continuous strand of glass filaments. Suitable methods for applying the impregnating agent include applicators having belts, rollers, and hot melt applicators. Suitable methods are for example described in documents EP0921919, EP0994978B1, EP0397505B1, WO2014/053590A1 and references cited therein.

The polymer sheath consists of a thermoplastic polymer composition.

Preferably, the melt flow rate (MFR) of the thermoplastic polymer is in the range from 20 to 150 dg/min, preferably in the range from 25 to 120 dg/min, for example in the range from 35 to 100 dg/min as measured according to ISO1133 (2.16 kg/230° C.).

The thermoplastic polymer composition preferably comprises a thermoplastic polymer. Suitable examples of thermoplastic polymers include but are not limited to polyamide, such as polyamide 6, polyamide, 66 or polyamide 46; polyolefins, for example polypropylenes and polyethylenes; polyesters, such as polyethylene terephthalate, polybutylene terephthalate; polycarbonates; polyphenylene sulphide; polyurethanes and mixtures thereof.

The thermoplastic polymer is preferably a polyolefin, more preferably a polyolefin chosen from the group of polypropylenes or elastomers of ethylene and α-olefin comonomer having 4 to 8 carbon atoms, and any mixtures thereof.

In one embodiment, preferably the thermoplastic polymer composition comprises at least 80 wt % of a thermoplastic polymer, for example at least 90 wt % polyolefin, at least 93 wt %, for example at least 95 wt %, for example at least 97 wt % of thermoplastic polymer, for example at least 98 wt % or for example at least 99 wt % of a thermoplastic polymer based on the thermoplastic polymer composition. In a special embodiment, the thermoplastic polymer composition consists of a thermoplastic polymer.

In another embodiment, the thermoplastic polymer composition comprises at least 60 wt %, for example at least 70 wt %, for example at least 75 wt % and/or at most 99 wt %, for example at most 95 wt %, for example at most 90 wt % thermoplastic polymer.

The polypropylene may for example be a propylene homopolymer or a random propylene-α-olefin copolymer or a heterophasic propylene copolymer.

A propylene homopolymer can be obtained by polymerizing propylene under suitable polymerization conditions. A propylene copolymer can be obtained by copolymerizing propylene and one or more other α-olefins, preferably ethylene, under suitable polymerization conditions. The preparation of propylene homopolymers and copolymers is, for example, described in Moore, E. P. (1996) Polypropylene Handbook. Polymerization, Characterization, Properties, Processing, Applications, Hanser Publishers: New York.

The α-olefin in the random propylene α-olefin copolymer is for example an α-olefin chosen from the group of α-olefin having 2 or 4 to 10 C-atoms, preferably ethylene, 1-butene, 1-hexene or any mixtures thereof. The amount of α-olefin is preferably at most 10 wt % based on the propylene α-olefin copolymer, for example in the range from 2-7 wt % based on the propylene α-olefin copolymer.

Polypropylenes can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratio.

The heterophasic propylene copolymer as defined herein consists of a propylene-based matrix and a dispersed ethylene-α-olefin copolymer.

The propylene-based matrix typically forms the continuous phase in the heterophasic propylene copolymer.

The propylene-based matrix consists of a propylene homopolymer and/or a propylene-α-olefin copolymer consisting of at least 70% by mass of propylene and up to 30% by mass of α-olefin, for example ethylene, for example consisting of at least 80% by mass of propylene and up to 20% by mass of α-olefin, for example consisting of at least 90% by mass of propylene and up to 10% by mass of α-olefin, based on the total mass of the propylene-based matrix.

Preferably, the α-olefin in the propylene-α-olefin copolymer is selected from the group of α-olefins having 2 or 4-10 carbon atoms and is preferably ethylene.

Preferably, the propylene-based matrix consists of a propylene homopolymer.

The melt flow index (MFI) of the propylene-based matrix (before it is mixed into the composition of the invention) may be in the range of for example 0.3 to 200 dg/min as measured according to ISO1133 (2.16 kg/230° C.).

The propylene-based matrix is for example present in an amount of 50 to 85 wt % based on the total heterophasic propylene copolymer.

Besides the propylene-based matrix, the heterophasic propylene copolymer also consists of a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form.

The MFI of the dispersed ethylene α-olefin copolymer may vary between wide range and may for example be in the range from for example be in the range from 0.001 to 10 dg/min (measured according to ISO1133 (2.16 kg/230° C. as calculated using the following formula:

$$MFR\ EPR = 10^{\wedge}\left(\frac{\text{Log }MFR\text{ heterophasic} - \text{matrix content} * \text{Log }MFR\ PP}{\text{rubber content}}\right)$$

wherein MFR heterophasic is the melt flow rate of the heterophasic propylene copolymer measured according to ISO1133 (2.16 kg/230° C.), MFR PP is the MFR of the propylene-based matrix of the heterophasic propylene copolymer measured according to ISO1133 (2.16 kg/230° C.)

matrix content is the amount of propylene-based matrix in the heterophasic propylene copolymer in wt % and rubber content is the amount of ethylene α-olefin copolymer in the heterophasic propylene copolymer in wt %.

The dispersed ethylene-α-olefin copolymer is for example present in an amount of 50 to 15 wt % based on the total heterophasic propylene copolymer.

For example, the amount of ethylene in the ethylene-α-olefin copolymer (RCC2) is in the range of 20-65 wt % based on the ethylene-α-olefin copolymer.

The amounts of the propylene-based matrix and the dispersed ethylene-α-olefin copolymer, as well as the amount of ethylene in the ethylene α-olefin copolymer may be determined by $^{13}$C-NMR, as is well known in the art.

In the heterophasic polypropylene, the sum of the total weight of the propylene-based matrix and the total weight of the dispersed ethylene-α-olefin copolymer is 100 wt %

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexen, 1-heptene and 1-octene.

The elastomer of ethylene and α-olefin comonomer having 4 to 8 carbon atoms may for example have a density in the range from 0.850 to 0.915 g/cm³. Such elastomers are sometimes also referred to as plastomers.

The α-olefin comonomer in the elastomer is preferably an acyclic monoolefin such as 1-butene, 1-pentene, 1-hexene, 1-octene, or 4-methylpentene.

Accordingly, the elastomer is preferably selected from the group consisting of ethylene-1-butene copolymer, ethylene-1-hexene copolymer, ethylene-1-octene copolymer and mixtures thereof, more preferably wherein the elastomer is selected from ethylene-1-octene copolymer. Most preferably, the elastomer is an ethylene-1-octene copolymer.

Preferably, the density of the elastomer is at least 0.865 g/cm³ and/or at most 0.910 g/cm³. For example, the density of the elastomer is at least 0.850, for example at least 0.865, for example at least 0.88, for example at least 0.90 and/or for example at most 0.915, for example at most 0.910, for example at most 0.907, for example at most 0.906 g/cm³. More preferable the density of the elastomer is in the range from 0.88 up to an including 0.907 g/cm³, most preferably, the density of the elastomer is in the range from 0.90 up to and including 0.906 g/cm³.

Elastomers which are suitable for use in the current invention are commercially available for example under the trademark EXACT™ available from Exxon Chemical Company of Houston, Tex. or under the trademark ENGAGE™ polymers, a line of metallocene catalyzed plastomers available from Dow Chemical Company of Midland, Mich. or under the trademark TAFMER™ available from MITSUI Chemicals Group of Minato Tokyo or under the trademark Nexlene™ from SK Chemicals.

The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomer s may also be prepared using traditional types of heterogeneous multi-sited Ziegler-Natta catalysts.

Preferably, the elastomer has a melt flow index of 0.1 to 40 dg/min (ISO1133, 2.16 kg, 190° C.), for example at least 1 dg/min and/or at most 35 dg/min. More preferably, the elastomer has a melt flow index of at least 1.5 dg/min, for example of at least 2 dg/min, for example of at least 2.5 dg/min, for example of at least 3 dg/min, more preferably at least 5 dg/min and/or preferably at most 30 dg/min, more preferably at most 20 dg/min, more preferably at most 10 dg/min measured in accordance with ISO 1133 using a 2.16 kg weight and at a temperature of 190° C.

Preferably, the amount of ethylene incorporated into the elastomer is at least 50 mol %. More preferably, the amount of ethylene incorporated into the elastomer is at least 57 mol %, for example at least 60 mol %, at least 65 mol % or at least 70 mol %. Even more preferably, the amount of ethylene incorporated into the elastomer is at least 75 mol %. The amount of ethylene incorporated into the elastomer may typically be at most 97.5 mol %, for example at most 95 mol % or at most 90 mol %.

The thermoplastic polymer composition may contain the usual additives, for instance nucleating agents and clarifiers, stabilizers, release agents, fillers, peroxides, plasticizers, anti-oxidants, lubricants, antistatics, cross linking agents, scratch resistance agents, high performance fillers, pigments and/or colorants, impact modifiers, flame retardants, blowing agents, acid scavengers, recycling additives, coupling agents, anti-microbials, anti-fogging additives, slip additives, anti-blocking additives, polymer processing aids and the like. Such additives are well known in the art. The skilled person will know how to choose the type and amount of additives such that they do not detrimentally influence the aimed properties. In a special embodiment, the thermoplastic polymer composition consists of the thermoplastic polymer and additives.

The amount of impregnated continuous multifilament strand is in the range of 10 to 70 wt %, for example in the range from 15 to 70 wt %, for example in the range from 20 to 70 wt % or for example in the range from 25 to 70 wt % based on the sheathed continuous multifilament strands. Preferably, the sum of the amount of impregnated continuous multifilament strand and the polymer sheath is 100 wt %.

In another aspect, the invention relates to a laminate of a plurality of tapes of the invention. Within the framework of the invention, with 'laminate' is meant an arrangement in which at least two plies (layers) of the tapes of the invention are present. For example, such laminate contains 2, 3, 4, 5, 6, 7, 8, 9, 10, or more plies, wherein one ply consists of the tape of the invention. For example, in the laminate, the plies may be positioned such that their respective sheathed continuous multifilament strands are not parallel to each other. In case their respective sheathed continuous multifilament strands are positioned in relation to one other in a substantially 90° angle, such laminate is usually referred to as cross-ply. Laminates of the invention can for example be assembled or processed into two-dimensional or three-dimensional structures, such as, for example, via winding and/or lay-up techniques.

In another aspect, the invention relates to an article comprising the tape of the invention or the consolidated laminate of the invention.

In another aspect, the invention relates to a process for the production of the tape of the invention comprising the steps of d) providing the plurality of sheathed continuous multifilament strands e) placing the plurality of sheathed continuous multifilament strands in parallel alignment in the longitudinal direction f) grouping the plurality of sheathed continuous multifilament strands wherein steps e) and f) are performed such that the sheathed continuous multifilament strand can be consolidated g) subsequently consolidating the plurality of sheathed continuous multifilament strands to form the tape.

For purpose of the invention with 'such that the plurality of sheathed continuous multifilament strand can be consolidated' is meant that the plurality of sheathed continuous multifilament strands are placed in such a vicinity to one another that they can be melted together.

Steps e) and f) can be performed by first placing the plurality of sheathed continuous multifilament strands in parallel alignment in the longitudinal direction after which the plurality of sheathed continuous multifilament strands are grouped d. However, steps e) and f) can also be performed by first grouping the plurality of sheathed continuous multifilament strands after which the plurality of sheathed continuous multifilament strands is placed in a parallel alignment in the longitudinal direction.

Steps e) and f) can also be performed in one and the same step, for example by pulling the plurality of sheathed continuous multifilament strand through a slit die (a die with an opening in the form of a rectangle, preferably a slit die having an opening with dimensions that are comparable to the thickness and width dimensions of the tape to be produced).

Step g) of the consolidation of the plurality of sheathed continuous multifilament strand for form the tape is performed in a consolidation unit. An example of a consolidation unit includes but is not limited to a belt press.

In a special embodiment, the sheathed continuous multifilament strands are prepared by the sequential steps of a) unwinding from a package the continuous glass multifilament strands b) applying the impregnating agent to the continuous glass multifilament strands in an amount from 0.50 to 18.0 wt %, for example from 0.5 to 10.0 wt % or for example from 10.0 to 18.0 wt % based on the sheathed continuous multifilament strands to form the impregnated continuous multifilament strands and c) applying the sheath of the thermoplastic polymer composition around the impregnated continuous multifilament strands to form the sheathed continuous multifilament strands.

Such process is described in detail in WO2009/080281A1, which document is hereby incorporated by reference.

The sheathed continuous multifilament strands of step d) are the sheathed continuous multifilament strands obtained by step c) and wherein the sheathed continuous multifilament strands of step d) are subjected to step e) without cutting.

The tapes, laminates or articles of the invention can for example be used in an automotive application.

In another aspect, the invention relates to a tape obtained or obtainable by the process of the invention.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Materials Used.

As continuous glass multifilament strand a glass roving containing a sizing agent, which roving has a diameter of 19 micron and a tex of 3000 (tex means grams glass per 1000 m) was used. Its amount based on the sheathed continuous multifilament strand is indicated herein as GF (wt %).

A heterophasic propylene copolymer having a melt flow rate of 66 dg/min as measured according to ISO1133 at 230° C./2.16 kg was used (PP). The amount of ethylene-propylene copolymer in the heterophasic propylene copolymer (RC) was 18.5 wt %. The amount of ethylene in the ethylene-propylene copolymer (RCC2) was 55 wt % and the total ethylene amount in the heterophasic propylene copolymer (TC2) was 10 wt %. The matrix was a propylene homopolymer having a melt flow rate as measured according to ISO1133 at 230° C. was 156 dg/min, the melt flow rate of the ethylene-propylene copolymer as calculated as described herein was 1.5 dg/g.

As a polyolefin elastomer (POE), Engage 8200 from Dow Chemicals was used. It is an ethylene-octene copolymer having a melt flow rate of 5.0 g/10 min as measured according to ASTM1238 at 190° C./2.16 kg).

As impregnating agent, a highly branched polyethylene wax having a viscosity of 50 mPa·s as measured according to ASTM D 3236-15 at 100° C. was used (Paraflex 4843A).

Preparation of the Single Strands Composites

Single sheathed continuous multifilament strands were prepared from the compositions as given in Table 1 using the wire coating process as described in the examples of WO2009/080281A1.

Preparation of the Tapes

The tapes were prepared from the single sheathed continuous multifilament strands by the following process. First, the single sheathed continuous multifilament strands were manually winded over the metallic cylinder. Winding was done in such a way to ensure that alignment of strands remained as straight as possible throughout the circumference of cylinder. A good alignment was found to improve the side adhesion of neighbouring strands and as a consequence improves the properties of the tapes prepared.

The cylinder was then clamped or taped from the ends to prevent the strands from falling of the cylinder. The cylinder was then placed in an oven at 170-180° C. for the PP containing composition and at 100-110° C. for the POE containing composition. The cylinder was kept at this temperature for 3 minutes and was then left for 4 hours to cool to room temperature (22° C.).

After cooling, the joined strands were cut from the cylinder to obtain a flat sheet of the tape.

The obtained flat sheets of the tape were consolidated using a double belt press machine (KFK-XL 1900 from Mayer, RützDouble) by placing the samples on the belt, covering them in silicon and Teflon sheets and then passing the flat sheets under the double belt. The gap between the belts was set such that the thickness of the tapes was reduced to an average of 2.0 mm. The temperature of the double belt press machine was set to 120° C. for those composition containing POE and to 180° C. for those composition containing PP. As a belt speed 2.0 m/min was used.

Preparation of Laminates

Crossply laminates were prepared from the tapes by placing two consolidated tapes in perpendicular position to each other and by repeating the step of the double belt press. For the lamination, the belt speed was set to 1.0 m/min and the gap between the belts was set such that the thickness of the laminates was on average 4.0 mm.

Methods of Characterization

Samples for impact testing were cut from the crossply laminated by using a waterjet machine.

Samples for tensile testing were cut from the tapes by using a shear cutter.

The tensile strength of the samples was determined using ASTM D3039 using the following test conditions: Clamping pressure: 70 bar, strain rate: 0.01 min$^{-1}$, test speed: 2 mm min$^{-1}$, gage length: 139.7 mm and clamping length 55.1 mm, Extensiometer length: 50 mm.

For testing the impact properties of the crossply laminate, the Instrumented multiaxial impact was measured using ISO 6603-2 using the following test conditions: Impact speed: 4.4 m/s, Impact type: Hydraulic controlled, Dart diameter: 20 mm, Support ring diameter: 40 mm, Specimen dimensions: 100 mm diameter circular disk. The obtained value for the impact in J was divided by the thickness of the crossply laminate to obtain the impact energy per unit of thickness.

Results:

The results are shown in Table 1. As can be seen from Table 1, the E-modulus (also known as Young's modulus or stiffness) as well as the impact energy per unit of thickness is higher for the examples according to the invention which contain wax (impregnating agent) as compared to the comparative examples which do not contain wax. In addition, it can be seen from the table that a higher amount of wax further increases the impact.

In addition, it can be seen when comparing E1 to E2 that a higher amount of glass fibers increases the E-modulus, indicating the puncture resistance of the tape or laminate of the invention may also be improved.

TABLE 1

Results.

| | E1 | E2 | E3 | CE1 | CE2 | CE3 |
|---|---|---|---|---|---|---|
| GF (wt %) | 20 | 60 | 60 | 20 | 60 | 60 |
| Wax (wt %) | 2.5 | 5 | 5 | 0 | 0 | 0 |
| POE (wt %) | 75.75 | 33.25 | | 78.25 | 38.25 | |
| PP (wt %) | | | 33.25 | | | 38.25 |
| Stabilizer (wt %) | 0.25 | 0.25 | 0.25 | 0.25 | 0.25 | 0.25 |
| Coupling agent (wt %) | 1.5 | 1.5 | 1.5 | 1.5 | 1.5 | 1.5 |
| Thickness of the tape (mm) | 2.8 | 1.9 | 2.2 | 3.1 | 1.9 | 2.0 |
| E-modulus (GPa) | 5 | 15.5 | 17.3 | 3.2 | 7.2 | 14.6 |
| Thickness of the laminate (mm) | 5.5 | 3.6 | 3.9 | 6.3 | 4.0 | 3.9 |
| Impact Energy per unit of thickness (J/mm) | 7.4 | 17.1 | 15.3 | 6.1 | 12.2 | 8.8 |

The invention claimed is:

1. Tape comprising a plurality of sheathed continuous multifilament strands,
wherein each of the sheathed continuous multifilament strands comprises a core that extends in the longitudinal direction and
a polymer sheath which intimately surrounds said core,
wherein each of the cores comprises an impregnated continuous multifilament strand comprising at least one continuous glass multifilament strand, wherein the at least one continuous glass multifilament strand is impregnated with an impregnating agent in an amount from 0.50 to 18.0 wt %, based on the sheathed continuous multifilament strand,
wherein the impregnating agent has a melting point of at least 20° C. below the melting point of the thermoplastic polymer composition, has a viscosity of from 2.5 to 200 cS at 160° C.,
wherein the continuous glass multifilament strand comprises at most 2 wt % of a sizing composition based on the continuous glass multifilament strand,
and wherein the polymer sheath consists of a thermoplastic polymer composition, wherein the thermoplastic polymer composition comprises at least 60 wt %, of a thermoplastic polymer,
wherein the amount of impregnated continuous multifilament strand is in the range of 10 to 70 wt % based on the sheathed continuous multifilament strands and wherein the amount of polymer sheath is in the range of 30 to 90 wt % based on the sheathed continuous multifilament strand and wherein the sum of the amount of impregnated continuous multifilament strand and the polymer sheath is 100 wt %.

2. Tape according to claim 1, wherein the amount of impregnated continuous multifilament strand is in the range of 25 to 70 wt % based on the sheathed continuous multifilament strands.

3. Tape according to claim 1, wherein the thermoplastic polymer is a polyolefin.

4. Tape according to claim 3, wherein the polyolefin is chosen from the group of polypropylenes or elastomers of ethylene and α-olefin comonomer having 4 to 8 carbon atoms, and any mixtures thereof.

5. Tape according to claim 1, wherein the melt flow rate of the thermoplastic polymer composition is in the range from 20 to 150 dg/min, as measured according to ISO01133 (2.16 kg/230° C.).

6. Tape according to claim 1, wherein the thermoplastic polymer composition comprises at least 80 wt % of the thermoplastic polymer, based on the thermoplastic polymer composition.

7. Tape according to claim 1, wherein the amount of impregnating agent is 1.5 to 8 wt %, based on the sheathed continuous multifilament strand.

8. Laminate of a plurality of tapes of claim 1.

9. Article comprising the tape of claim 1.

10. Process for the production of the tape of claim 1 comprising the steps of:
d) providing the plurality of sheathed continuous multifilament strands,
e) placing the plurality of sheathed continuous multifilament strands in parallel alignment in the longitudinal direction,
f) grouping the plurality of sheathed continuous multifilament strands,
wherein steps e) and f) are performed such that the sheathed continuous multifilament strand can be consolidated, and
g) subsequently consolidating the plurality of sheathed continuous multifilament strands to form the tape.

11. Process according to claim 10, wherein steps e) and f) are performed by pulling the plurality of sheathed continuous multifilament strands through a slit die.

12. Process according to claim 10, wherein the consolidation of the plurality of sheathed continuous multifilament strands is performed in a consolidation unit.

13. Process according to claim 10, wherein the sheathed continuous multifilament strands are prepared by the sequential steps of:

a) unwinding from a package the continuous glass multifilament strands, b) applying the impregnating agent to the continuous glass multifilament strands in an amount from 0.50 to 18.0 wt %, based on the sheathed continuous multifilament strands to form the impregnated continuous multifilament strands, and c) applying the sheath of the thermoplastic polymer composition around the impregnated continuous multifilament strands to form the sheathed continuous multifilament strands.

14. Process according to claim 10, wherein the sheathed continuous multifilament strands of step d) are the sheathed continuous multifilament strands obtained by step c) and wherein the sheathed continuous multifilament strands of step d) are subjected to step e) without cutting.

15. Tape according to claim 1, wherein the thermoplastic polymer composition comprises at least 90 wt % of the thermoplastic polymer, based on the thermoplastic polymer composition.

16. Tape according to claim 1, wherein the thermoplastic polymer composition comprises at least 95 wt % of the thermoplastic polymer, based on the thermoplastic polymer composition.

* * * * *